United States Patent
Baron, Sr. et al.

[11] Patent Number: 6,018,699
[45] Date of Patent: Jan. 25, 2000

[54] SYSTEMS AND METHODS FOR DISTRIBUTING REAL-TIME SITE SPECIFIC WEATHER INFORMATION

[75] Inventors: Robert O. Baron, Sr., Huntsville; Tom S. Thompson, Athens; Tony L. Benson, Huntsville, all of Ala.

[73] Assignee: Baron Services, Inc., Huntsville, Ala.

[21] Appl. No.: 08/869,269

[22] Filed: Jun. 4, 1997

Related U.S. Application Data

[60] Provisional application No. 60/018,921, Jun. 4, 1996.

[51] Int. Cl.$^7$ .................................................. G06F 169/00
[52] U.S. Cl. .................................................. 702/3
[58] Field of Search ................... 702/3, 4, 5; 342/26, 342/460; 345/327, 328; 348/592, 598, 599

[56] References Cited

U.S. PATENT DOCUMENTS

| | | | |
|---|---|---|---|
| 4,277,845 | 7/1981 | Smith et al. | 455/52 |
| 4,347,618 | 8/1982 | Kavouras et al. | 375/37 |
| 4,521,857 | 6/1985 | Reynolds, III | 364/439 |
| 4,725,886 | 2/1988 | Galumbeck et al. | 348/461 |
| 5,023,934 | 6/1991 | Wheeless | 455/45 |
| 5,140,419 | 8/1992 | Galumbeck et al. | 348/465 |
| 5,379,215 | 1/1995 | Kruhoeffer et al. | 364/420 |
| 5,517,193 | 5/1996 | Allison et al. | 342/26 |
| 5,568,385 | 10/1996 | Shelton | 364/420 |
| 5,583,972 | 12/1996 | Miller | 395/119 |
| 5,717,589 | 2/1998 | Thompson et al. | 702/3 |
| 5,805,156 | 9/1998 | Richmond et al. | 345/328 |

OTHER PUBLICATIONS

Gilhousen, D.B., "Methods of Obaining Weather Data in Real Time", Oceans '88: A Partnership of Marine Interests, vol. 4, 1988, pp. 1341–1343, Nov. 1988.

*Primary Examiner*—Donald E. McElheny, Jr.
*Attorney, Agent, or Firm*—Lanier Ford Shaver & Payne P.C.; Frank M. Caprio, Esq.; Russell L. Sandidge, Esq.

[57] ABSTRACT

A system for providing real-time site specific weather information comprises a weather alert manager that receives meteorological data and combines the meteorological data with a geographical grid covering a predefined geographic area to produce a storm profile for the storms within the geographical area, wherein the geographic grid partitions the geographic area into a plurality of cells. A distribution network distributes the storm profiles to remote units that are responsive to the storm profiles. The remote units are configured to process the storm profiles and present real-time site specific weather information based upon the storm profile. The storm profiles may include a cell identifier that identifies a cell of the geographic grid that is affected by the storm. In addition, the storm profiles may further include a storm identifier, a storm type identifier, and a presence qualifier associated with each cell identified.

34 Claims, 5 Drawing Sheets

SYSTEMS AND METHODS FOR DISTRIBUTING REAL-TIME SITE SPECIFIC WEATHER INFORMATION

RELATED APPLICATIONS

This application claims the benefit of United States Provisional application Ser. No. 60/018,921, filed Jun. 4, 1996, and entitled "SYSTEM AND METHOD FOR SITE SPECIFIC ALERTING FOR TORNADOS".

FIELD OF THE INVENTION

The present invention generally relates to systems and methods for weather reporting and forecasting, and more particularly, to computerized systems and methods for reporting and forecasting real-time weather information.

BACKGROUND OF THE INVENTION

The importance of weather reporting and forecasting in our daily lives cannot be contested. A large percentage of the people in the United States watch their local evening news on a nightly basis to see the local weather report and forecast. This information may then used to make decisions for the next day, or for the upcoming weekend, such as what to wear, what activity to participate in, what activity not to participate in, what to bring on an outing, etc. Under certain circumstances, such as in the case of severe weather, some people may find themselves in situations where they are making life and death decisions based upon the weather information they have available to them.

To assist local television stations, as well as the national networks, in providing accurate and timely weather reporting and forecasting, the National Weather Service (NWS) maintains a network of radar installations located at approximately one hundred thirty-eight sites throughout the United States. Observers at each of these installations monitor the weather conditions within their area and provide hourly teletyped messages to subscribers, typically through a third party weather service provider such as GTE Contel, a subsidiary of GTE Government Systems. In addition, other services provide lightning strike information on a subscription basis, such as through Global Atmospherics, Arizona, U.S.A.

The weather information provided by any one or a combination of the above services may be synthesized at a local television station into a understandable format for presentation to the public. In general, the meteorological data is gathered at the local television station and combined with image maps of a geographical region to generate a weather image i.e., a graphical illustration of the weather. In addition, the local temperatures for various communities or cities within the viewing area of the station may also be generated on the weather image. A sequence of these composite weather images can be looped to create weather animation. The local television station may then broadcast the weather images to viewers.

Although the current weather reporting and forecasting systems used by television stations and networks have much benefit, they may not provide relevant weather information during severe weather. This is particularly true when it comes to the existence of severe weather which arises quickly without much warning, as is often the case with tornados. It is well known that tornados and other types of severe weather can strike quickly without much prior notice. The information provided by the television stations and networks regarding these types of severe weather are seldom provided in a real-time fashion and are generally not detailed as to the specific location or direction of the weather front. Therefore, the public is often not given sufficient warning to adequately prepare for the weather in order to protect their property or find a safe refuge for themselves. Moreover, the weather information that is provided is often provided on a county wide basis which, depending on the size of the county, the actual path of the severe weather through a county, and the position of the listeners within the county, may be irrelevant. The listener may consequently become impatient or inattentive, and stop viewing the weather report.

An alternative source of weather information is through weather radios such as the Realistic Weather Radio Alert III, Model No. 12-140, distributed through Radio Shack®, a division of the Tandy Corporation. In general, weather radios may provide listeners with prerecorded or live weather updates on an essentially continuous basis. The weather radios receive the weather information updates which are broadcasts by the national Weather Service (NWS) from local transmitters using specific frequencies designated by the Federal Communication Commission (FCC). The weather updates usually comprise regular weather information which is prerecorded and then broadcast, except for the issuance of severe weather watches or warnings. In those cases, a prerecorded (or sometimes live) watch or warning message is preceded by a tone (e.g., a 1,000 cycle tone) that is manually activated at the broadcast station. The tone weather radios that are turned on and within the range of the broadcasted signal may receive the tone which activates an audible alarm on the radio. The audible alarm is typically not distinctive as to the whether it is for a watch and warning, nor does the audible alarm indicate the type or severity of the severe weather. The alarm will usually continue until the user pushes an alert key or button on the weather radio. It is noted that NWS personnel are responsible for both manually recording of the audio messages for broadcast and the manually activating of the tone.

Therefore, a need exists in the industry for an improvement in the delivery of real-time weather information for a localized area to people in that area during times of severe weather.

SUMMARY OF THE INVENTION

It is therefore an object of the present invention to provide more relevant weather information.

It is another object of the present invention is to provide site specific weather information.

It is another object of the present invention is to provide real-time weather information.

These and other objects are provided in accordance with the present invention by a system for providing real-time site specific weather information that comprises a weather alert manager that receives meteorological data and combines the meteorological data with a geographical grid covering a predefined geographic area to produce storm profiles for the storms within the geographical area, wherein the geographic grid partitions the geographic area into a plurality of cells. A distribution network distributes the storm profiles to remote units that are responsive to the storm profiles. The remote units are configured to process the storm profiles and present real-time site specific weather information based upon the storm profile. The storm profiles may include a cell identifier that identifies a cell of the geographic grid that is affected by the storm. In addition, the storm profiles may further include a storm identifier, a storm type identifier, a list of cells affected by the storm and a presence qualifier associated with each cell identified.

The storm distribution network preferably distributes the storm profiles to the remote units that are associated with the cells affected by the storm. For instance, a remote unit may receive storm profiles for a storm that is currently located within the present cell, or likely to cross the present cell. The distribution network may include means for addressing the storm profile to enable point-to-point distribution to the respective cells associated with a storm. The distribution network may comprise a land-line telephone network, a universal wireless network, a pager network, an Internet, or a local cable television network.

In accordance with a feature of the present invention, the meteorological data received by the weather alert manager comprises indications of the storm's speed, location, direction, and type. Further, the meteorological data may include a severity indicator of a storm. The meteorological data may be provided manually by a user such as someone from an emergency management agency, or automatically by a NexRad attributes data provider, or a combination of both manually and automatically gathered weather data.

The remote units may include an audible alarm that can be selectively actuated to distinguish between a warning alarm and a watch alarm. Further, the remote units may include an audible alarm that is selectively actuated to indicate a storm type. Alternatively, the remote units may include an visual indicator that may be selectively actuated to distinguish between a warning alarm and a watch alarm, and/or a visual indicator that is selectively actuated to indicate a storm type.

The weather alert manager may include means for predicting a path of the storm based upon the meteorological data. For example, the means for predicting a path of the storm may comprise a NexTrac® computer program from Baron Services, Huntsville, Ala., USA.

In accordance with another embodiment of the present invention, a method for providing real-time site specific weather information comprises the steps of receiving meteorological data, and combining the meteorological data with a geographical grid covering a predefined geographic area to produce a storm profile for a storm identified in the meteorological data, wherein the geographic grid partitions the geographic area into a plurality of cells. The method also includes the step of distributing the storm profile to a remote unit that is responsive to the storm profile for presenting real-time site specific weather information. The step of combining the meteorological data with a geographical grid to produce a storm profile may include producing the storm profile with a cell number that identifies a cell of the geographic grid that is affected by the storm. The method may further include the step of producing visual and/or audio alarms that can be selectively actuated by the remote units in response to the storm profiles in order to distinguish between warning alarms and watch alarms, and/or the type of the storm (e.g., thunder, hail, tornado, etc.). The method may also include the step of providing a severity indicator of said storm as a part of said meteorological data. Further, the step of combining said meteorological data with a geographical grid covering a predefined geographic area includes predicting a path of the storm based upon the meteorological data.

Other features and advantages of the present invention will become apparent to one with ordinary skill in the art upon examination of the following drawings and detailed description. It is intended that all such additional features and advantages be included herein within the scope of the present invention, as defined by the appended claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, like referenced numerals designate corresponding parts throughout the several views.

DETAILED DESCRIPTION OF PREFERRED EMBODIMENTS

The following description is of the best presently contemplated mode of carrying out the present invention. A system for distributing real-time site specific weather information to multiple users in accordance with the present invention has many uses in many different contexts, such as, at a golf course, a shopping mall, a school, an office building, or in a home. The real-time site specific weather information may be distributed by any number of communication mediums such as a wireless network, a land-line telephone network, or a television cable network. Accordingly, the present description of the preferred embodiments is not to be taken in a limiting sense but is made merely for the purpose of describing the general principles of the invention. The embodiments described are provided so that the disclosure will be thorough and complete, and will fully convey the scope of the invention to those skilled in the art.

I. System Architecture

Figure 1:
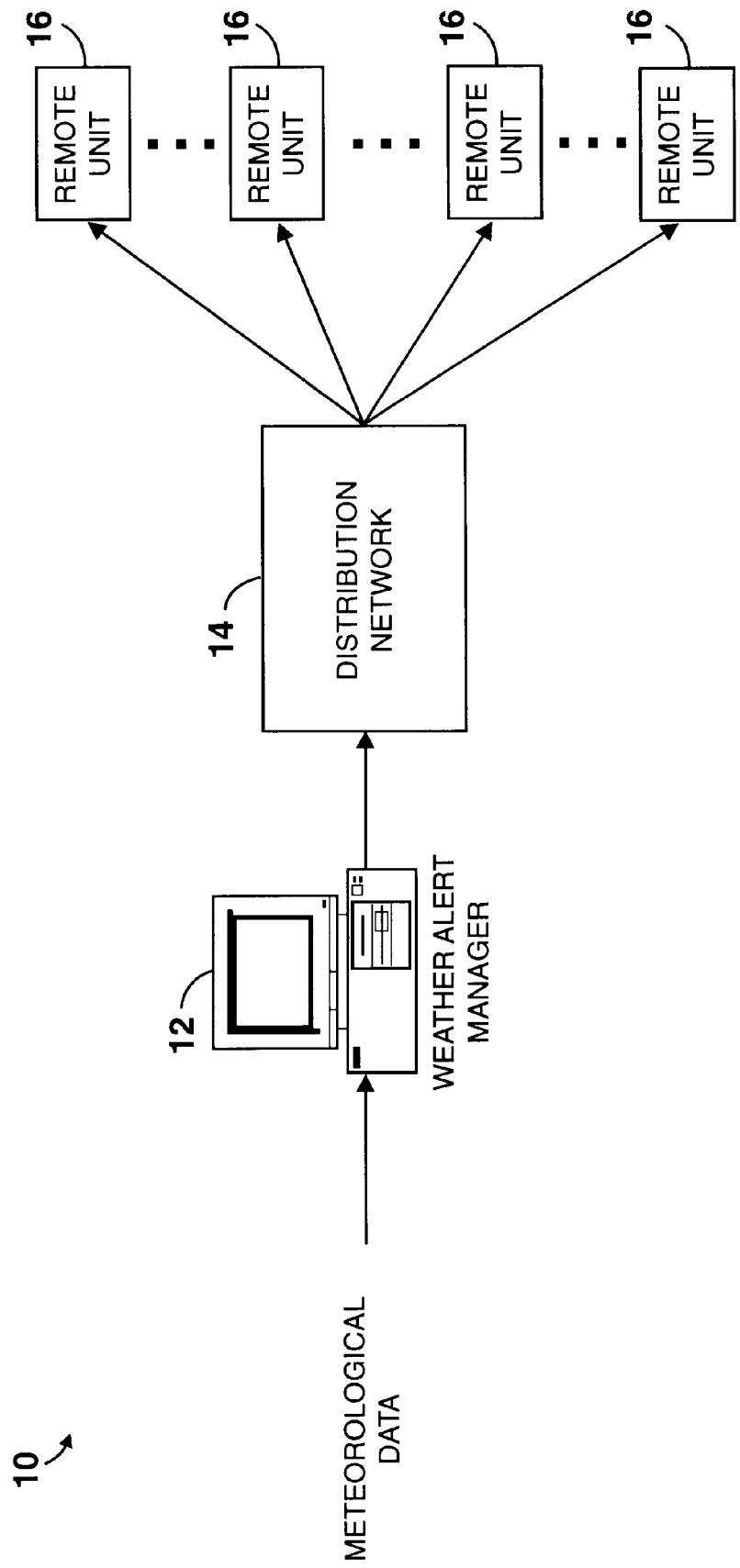
FIG. 1 is a schematic illustration of a system for distributing real-time site specific weather information.

With reference to FIG. 1, a system 10 for providing real-time site specific weather information in accordance with the present invention is illustrated. The system 10 comprises a weather alert manager 12, a distribution network 14, and a plurality of remote units 16. Briefly stated, the system 10 receives meteorological data including weather information for a geographic area which is relevant to one or more of the remote units 16. The meteorological data is processed to generate storm profiles for the storms within the meteorological data. The storm profiles are distributed to the respective remote units 16 by the distribution network 14. In response to the storm profiles, the remote units provide weather information that is relevant to a specific geographic area predefined for each remote unit 16. Accordingly, an end user is able to receive site specific weather information that is highly relevant.

Figure 2:
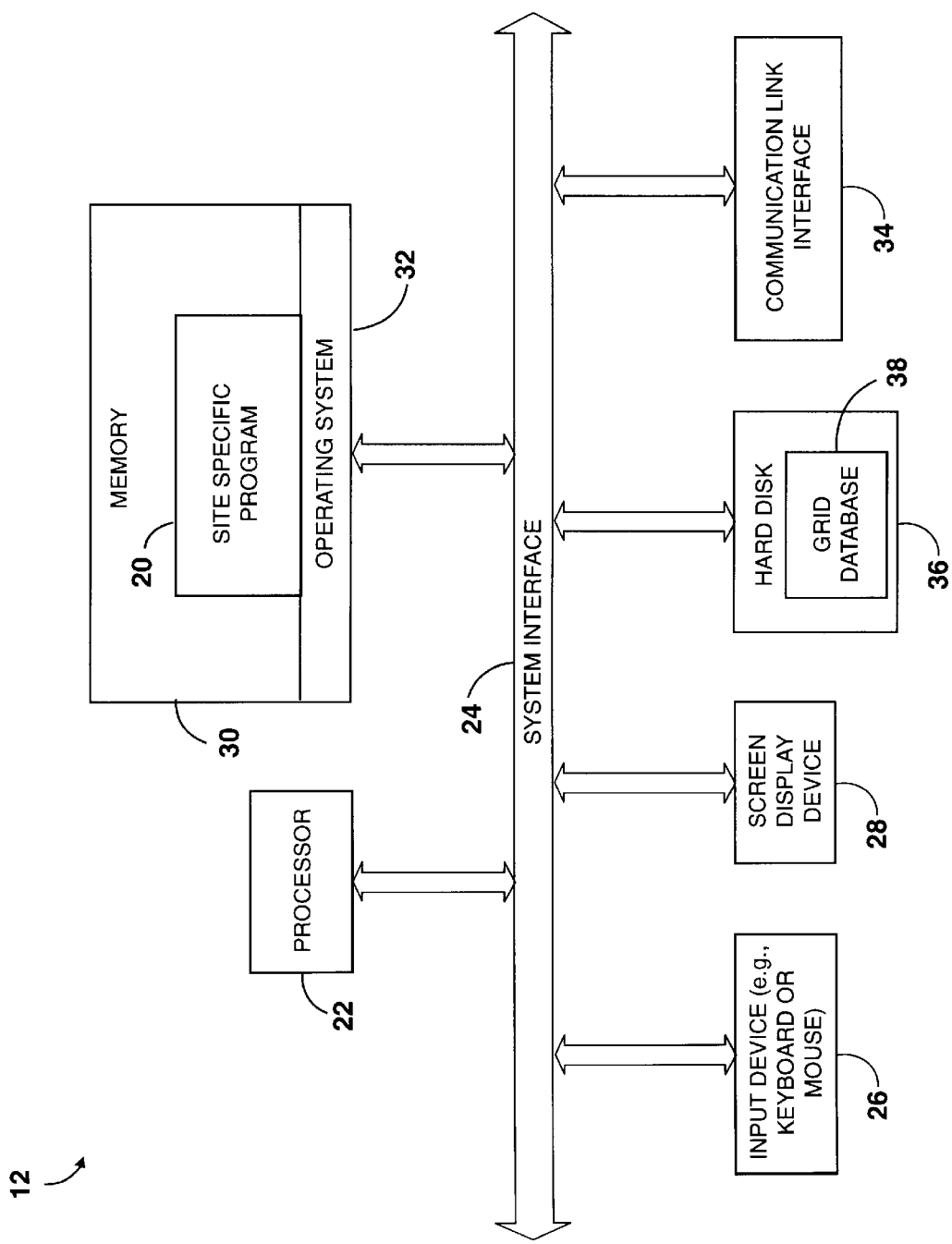
FIG. 2 is a block diagram illustrating the architecture and functionality of the weather alert manager of the system of FIG. 1.

An example of a configuration of the weather alert manager 12 is provided by the block diagram of FIG. 2. The weather alert manager 12 includes a site specific program 20 in accordance with the present invention. As shown, the weather alert manager 12 is preferably configured as a special purpose computer or other apparatus suitable for executing the program code embodied within the site specific program so as to impart the functionality described herein and those other functionalities necessary for the operation of the present invention as would be obvious to one of ordinary skill in the art. The weather alert manager 12 further includes a processor 22 that can communicate with the other elements within the weather alert manager 16 via system interface 24. An input device 26, for example, a keyboard or mouse, is used to input data from the user, and a screen display device 28, for example, a monitor, is used to output data to the user. A memory 30 within the weather alert manager 12 contains the site specific program 20 for imparting the functions described herein. In addition, the memory 30 includes a conventional operating system 32 that communicates with the site specific program 20 and enables execution of the site specific program 20 by the processor 22. A communication link interface 34 is provided for interfacing the weather alert manager 12 with other related systems for purposes such as receiving meteorological data or transmitting storm profiles to the distribution network 14. Lastly, a hard disk 36 is provided as a nonvolatile memory for storing information such as a grid database 38 as described in more detail below.

The weather alert manager 12 is configured to receive meteorological data via communication link interface 34, or alternatively, via manual input through input device 26. The meteorological data may be provided by a variety of sources, but preferably comprises NexRad attribute data. NexRad is a weather service provided by the National Weather Service (NWS) which employs a system of high powered radars scattered throughout the country which collect data that is synthesized for distribution to subscribers. The NexRad attribute data is distributed by several providers which can communicate the data via a satellite downlink or over a communication network connection such as a telephone line. Several of the NexRad providers are: Alden Electronics, Westborough, Mass., USA; UNISYS, Philadelphia, Pa., USA; and Weather Services International (WSI) Corporation, Billerica, Mass., USA. The NexRad attributes data provides subscribers with detailed information concerning storms detected by the NexRad radar sites. The NexRad attribute data may include the following information for each storm:

| ID | A unique 3-digit identifier for the storm. |
| --- | --- |
| AZ | The direction of the storm in degrees from the radar source. |
| RANGE | The distance of the storm in nautical miles from the radar source. |
| TVS | The likelihood of a tornado vortex signature (probably, possible or absolutely). |
| MESO | The likelihood of mesocyclonic activity probable, possible or absolutely). |
| HAIL | The likelihood of hail (probably, possible or absolutely). |
| DBZM | The maximum DBZ level (a measurement of participation intensity) in the storm. |
| FCST_ANGLE | Forecasted movement angle (storm path) in degrees. |
| FCST_MVMT | Forecasted movement speed in nautical miles per hour. |

A feature of NexRad data is that it can be automatically downloaded and provided to the weather alert manager without human interaction. Further, the different NexRad attributes can be combined to provide other attributes such as storm type, storm width, or storm severity. For example, the NexRad attributes TVS, MESO and HAIL may be utilized to provide an attribute for storm type. As another example, the NexRad attribute DBZM may be utilized to provide an attribute for storm width. As yet another example, the NexRad attributes TVS, MESO, HAIL and DBZM may be utilized to provide an attribute for storm severity.

In addition, the meteorological data may comprise manually inputted information regarding a storm. Preferably, this information is provided by the emergency management agency (EMA) or another similar entity such as a local 911 service charged with weather warnings. This allows for human reasoning to evaluate the severity of a storm so that factors not easily considered in an automated system may be considered. Examples of factors that may be considered in such circumstances include the terrain of the local area or the presence of high risk structures in the path of a storm such as a school or shopping mall. Thus, the storm attributes provided in the NexRad attributes can be alternatively provided manually.

The meteorological data received by the weather alert manager 12 is processed by the site specific program 20. Particularly, the site specific program 20 performs storm tracking functions on the storms that are identified by the meteorological data, and that are within the geographic region of interest. Systems capable of performing storm tracking functions, such as those required in the present system, which are commercially available include the Nex-Trac® system by Baron Services, Inc., Alabama, USA, or Storm Pro by Kavouras, Minnesota, USA.

There are essentially two methods of performing storm tracking operations. A first method involves gathering historical data of a particular storm so that the storm's direction and speed can be derived from the location of the storm at two discrete points in time which are recorded in the historical data. A direction of the storm can then be determined by a direction vector passing through the two locations of the storm. The speed of the storm can be determined from the distance between the two points and the time that it took the storm to travel between the two points. From the direction and speed, the location of the storm at some future point in time can be mapped out within an acceptable degree of accuracy. A second method includes retrieving the NexRad attributes FCST_ANGLE and FCST_MVMT, and then calculating the storm's position after a predefined period of time based upon these attributes, as described in detail below.

Initially, the NexRad attributes RANGE and AZ are utilized to determine a current x coordinate range and a current y coordinate range for the storm with respect to the NexRad radar site that is tracking the storm. The x and y coordinate ranges can then be utilized with the latitude and longitude coordinates of the NexRad radar site to determine a true location of the storm in latitude and longitude measurements. The latitude and longitude of the storm can be combined with the NexRad attributes FCST_ANGLE (i.e., forecasted direction) and FCST_MVMT (i.e., forecasted speed) to derive a position of the storm after a predetermined period of time.

In addition to determining a future position of the storm, the storm tracking function of the present invention includes tracking the width and fanout of the storm. The width can be determined from the NexRad attributes as described above, and the fanout is user defined. For purposes of the present disclosure, the fanout of a storm is the rate at which the storm track widens from the base of the storm to the end of the track. This parameter is preferably set between approximately 10 and 20 percent per meter. The fanout is essential an error factor that allows the future path of the storm to be determined with a greater tolerance. That is, the geographic area over which a storm may travel is more likely to be within a predicted path that accounts for a 10 percent widening of the storm as it moves. The fanout can be varied between two instances of the storm tracking operation for the same storm to create qualifiers that indicate the likelihood that the storm will affect a particular cell. These qualifiers are referred to hereafter as presence qualifiers. As an example, a storm tracking operation performed on a storm with 10 percent fanout may result in ten cells that the storm will "probably" cross. If the storm tracking operation were performed a second time with a fanout of 20 percent, then the results may include twenty or more cells that the storm may "possibly" cross. Thus, the weather information that can be delivered to the end user at the remote unit 16 is both relevant and informative.

The site specific program 20 then combines the storm tracking information with a geographic grid to determine which location(s) within the geographic grid arc affected by the storm. The geographic grid comprises a geographic region that is divided into a plurality of cells that are individually identified by a unique identification number. Each cell preferably comprises at least one latitude coordinate and one longitude coordinate, though the size of the cells can be defined by the user. By comparing the coordinates defining the predicted path of the storm to the geographic grid on a cell by cell basis, each cell within the grid that is affected by the storm can be identified. Furthermore, by running multiple instances of the storm tracking with different fanout settings, presence qualifiers can be determined for the identified cells that the storm is currently crossing, probably approaching, or possibly approaching.

The site specific program 20 then generates a storm profile for the storms identified in the meteorological data. The storm profiles generated by the site specific program 20 preferably include a storm type identifier, a severity indicator, and a list of cell numbers and associated presence qualifiers such as "in this cell," "possibly approaching this cell," or "probably approaching this cell." The storm identifier is provided by the NexRad attribute ID, the severity indicator is either manually inputted by the EMA or automatically generated from one or more of the NexRad attributes, and the cell numbers and presence qualifiers are determined as described above. A data structure comprising a storm profile may appear as follows:

| storm ID | storm type | storm severity | cell #/ presence qualifier | ... | cell #/ presence qualifier |
|---|---|---|---|---|---|

Accordingly, a storm profile is a relatively small amount of data that can be transmitted as a serial bit stream to the remote units 16 with low overhead on the part of the distribution network 14.

The distribution network 14 is configured to deliver the storm profiles to the respective remote units 16. Because the storm profiles require so little bandwidth for transmission to the remote units, updated storm profiles information can be sent out to subscribers at a high frequency to ensure the weather information is real-time.

Preferably, the storm profiles are distributed according to an address integrated in the protocol overhead or the storm profile itself such as in an address field so that the remote units only respond to storm profiles that particularly identify cells which are associated with that remote unit 16. This can be accomplished by maintaining an end user database at the weather alert manager 12 that associates each end user to one or more of the cells. Thus, by cross referencing the cell numbers in a profile to a list of end users with associated cells, the specific end users that should be sent a storm profile can be identified. By identifying the end user, the remote unit 16 associated with that end user may be identified. The profiles may then be sent to the end user directly in a point-to-point communication utilizing the address. Alternatively, if the remote units 16 are configured to be responsive to specific address(es), then the profiles may be broadcast to all the remote units. The addresses in this case may be merely the cell numbers, and thereby, eliminate the need to provide a special address field to the data structure comprising the storm profile. The end user database may also identify the means by which the profile is to be sent to the subscriber (e.g., a cellular phone call with recorded message or a pager with an alpha numeric message).

The distribution network 14 can be implemented by a variety of different communication mediums such as, but not limited to, wireless, cable television, pager, land-line telephone, satellite, etc. This flexibility in the method by which the storm profiles are delivered by the distribution network is advantageous because it enables the subscriber to chose the most convenient method of delivering the site specific weather information of the present invention. The communication medium chosen may be based upon pricing tariffs, Federal Communications Commission (FCC) regulations, available technology, or the configuration of the remote unit (as described below). An example of one configuration for the distribution network 14 is a wireless network that initiates a call based upon a number (i.e., address) that the weather alert manager 12 retrieved from a subscriber database. The wireless network then makes a call to the remote unit 16 associated with that wireless telephone number for sending a storm profile to the remote unit 16 which processes the information for presentation to the subscriber in real-time.

The remote unit 16 is configured to receive a storm profile and respond thereto by providing audio and/or visual indicators which convey relevant storm information such as the type of storm, the severity of the storm, and the relevance of the storm with regard to the location of the remote unit 16. The remote unit 16 may be located throughout the geographic region covered by the geographic grid utilized by the weather alert manager 12. For instance, the remote units 16 may be located in a private home, a public facility such as a shopping mall or golf course, an office building, a school, or even a mobile vehicle such as a bus, taxicab, or plane.

Figure 3:
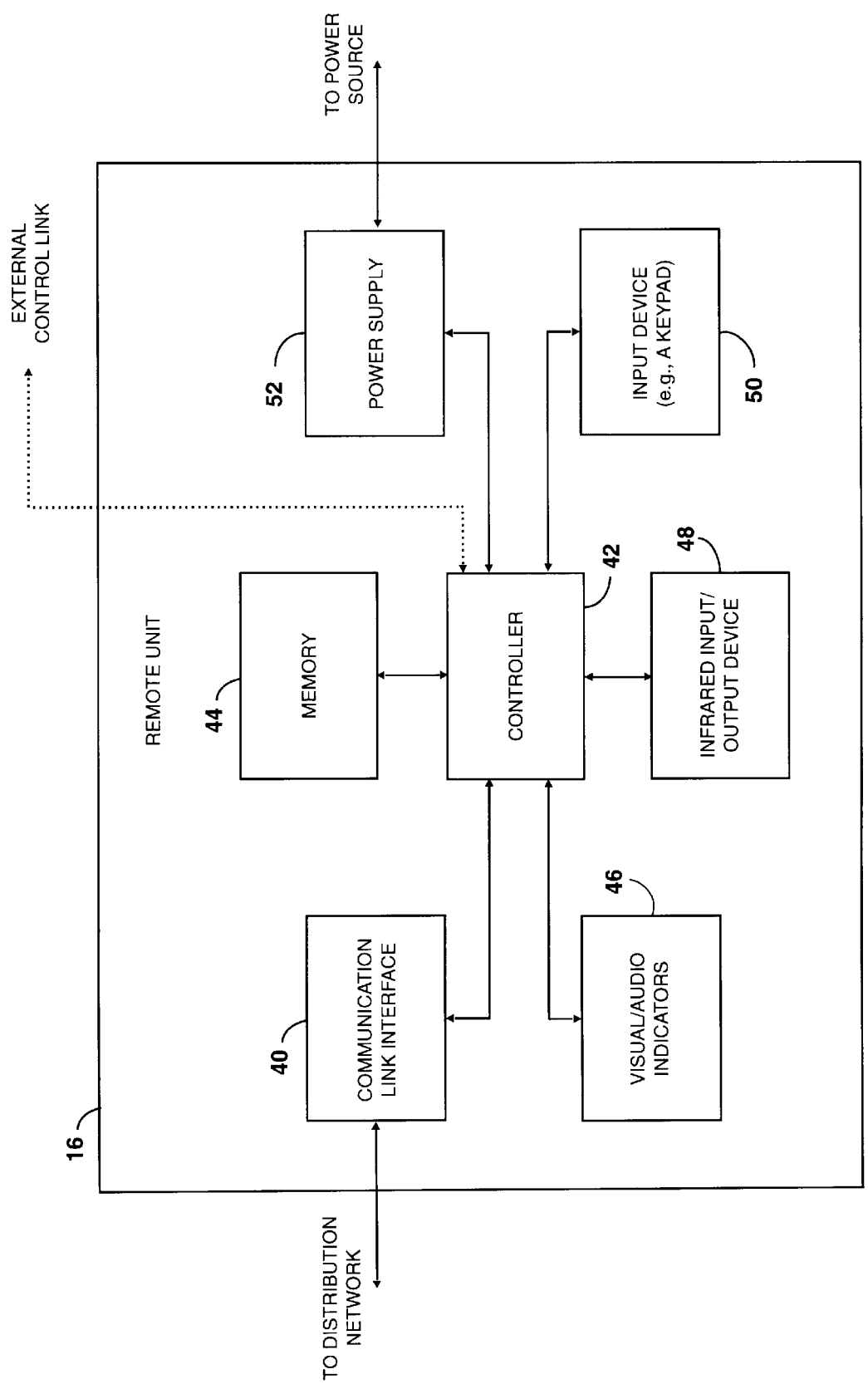
FIG. 3 is a block diagram of the remote unit of the system of FIG. 1.

An illustrative example of a configuration of a remote unit 16 is provided in FIG. 3. As shown, the remote unit 16 comprises a communication interface 40, a controller 42, a memory 44, an audio/video indicator mechanism 46, an infrared input/output device 48, an input device 50, and a power supply 52. The communication link interface 40 provides an interface to the distribution network 14 for receiving storm profiles in accordance with the present invention. The storm profiles are provided to the controller 42 which includes the control logic for operation of the remote unit 16. Briefly stated, the controller 42 processes the storm profile by parsing the data structure and making logical determinations as to the type/manner of weather information that will be provided to the subscriber via the visual/audio indicator mechanism 46. The control 42 may also include control logic for discriminating between storm profiles to ensure that the remote unit 16 only responds to storm profiles associated with its subscriber. As previously mentioned, this may include identifying an address field within the storm profile and comparing that with a programmed address, or alternatively, comparing the cell numbers within the storm profile with programmed cell numbers. On the other hand, the remote unit 16 may only receive storm profiles that are specifically addressed to it, and therefore, the remote unit 16 can process each storm profile it receives without having to evaluate its relevance.

The visual/audio indicator mechanism 46 provides means by which to convey the site specific weather information in the storm profile to the end user. The visual/audio indicator mechanism 46 may include a speaker device for providing audio indication of weather information in the form of distinctive sounds or prerecorded audio messages. In addition, the video/audio indicator mechanism 46 may include visual means such as a display panel for providing weather information in the form of textual information or color-coded lights. The infrared input/output device 48 provides the remote unit with the capability of interacting with other devices for performing such functions as turning on a television set to a specific channel when particular weather information is provided in a storm profile, or turning on a stereo to a particular channel for receiving additional weather information in response to particular information provided in a storm profile. The input device 50, such as a keypad, provides means by which the controller 42 can be programmed as may be desired, for instance, if the remote unit 16 is transferred from one subscriber to another. The power supply 52 provides power to the remote unit 16 for supporting operation thereof. The power supply 52 preferably provides proper power conversion capability so that the power supply may be plugged into a typical 110 volt wall outlet. Preferably, the power supply 52 also provides a battery backup for operating when there is a power outage of the power source utilized by the power supply 52. Lastly, an external control link may be provided as an alternative interface to controller 42 for purposes of programming or providing external control from a remote location. This link may comprise, for example, a dial-up modem connection that allows communication with the controller 42 from a remote location through the public switched telephone network.

While the remote unit 16 may be configured as illustrated in FIG. 3, the present invention also provides for remote units that are integrated into conventional communication devices such as wireless telephones or pagers. In this context, the distribution network 14 is determined by the type of remote unit 16. For example, if the remote unit 16 were a pager, then the distribution network 14 would be a pager network suitable for interfacing with the pager remote unit 16. Likewise, if the remote unit 16 is a cellular telephone, then the distribution network 14 would be a wireless network suitable for interfacing with the wireless remote unit 16.

II. Operation

Figure 4:
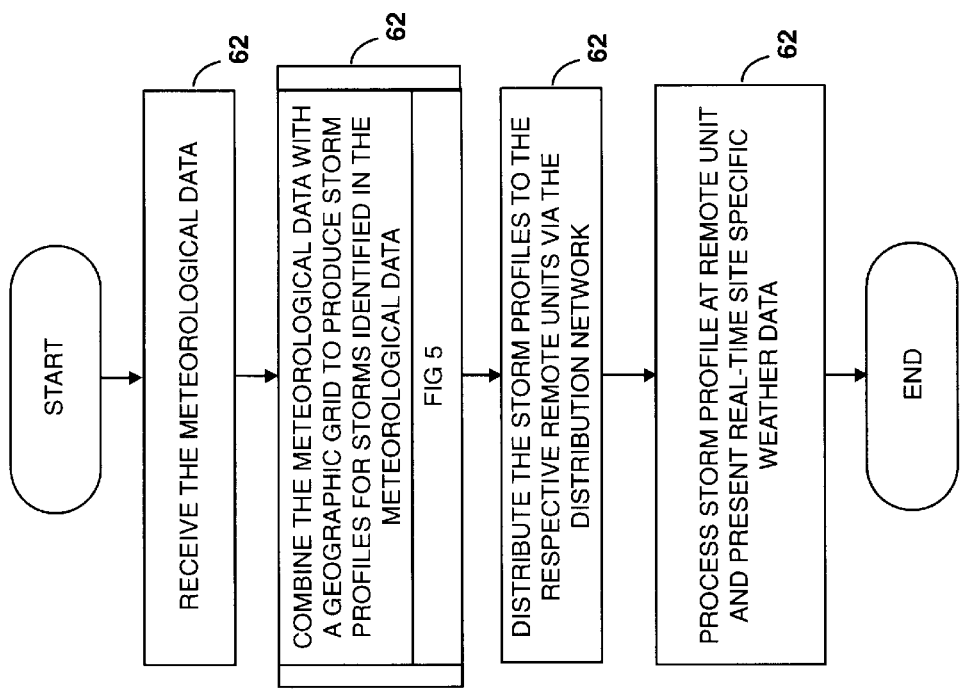
FIG. 4 is a flowchart of the operation of the system of FIG. 1.

With reference to FIG. 4, the weather alert manager 12 initially receives meteorological data including weather information defining storms within a relevant geographical area, as indicated by block 60. At block 62, the meteorological data is combined with a geographic grid to produce storm profiles for the storms identified in the meteorological data, as further described with reference to FIG. 5. Next, the storm profiles are distributed to the remote units 16 via the distribution network 14, as indicated by block 64. The storm profiles are processed at the respective remote units 16 for presentation of real-time site specific weather information, as indicated by block 66.

Figure 5:
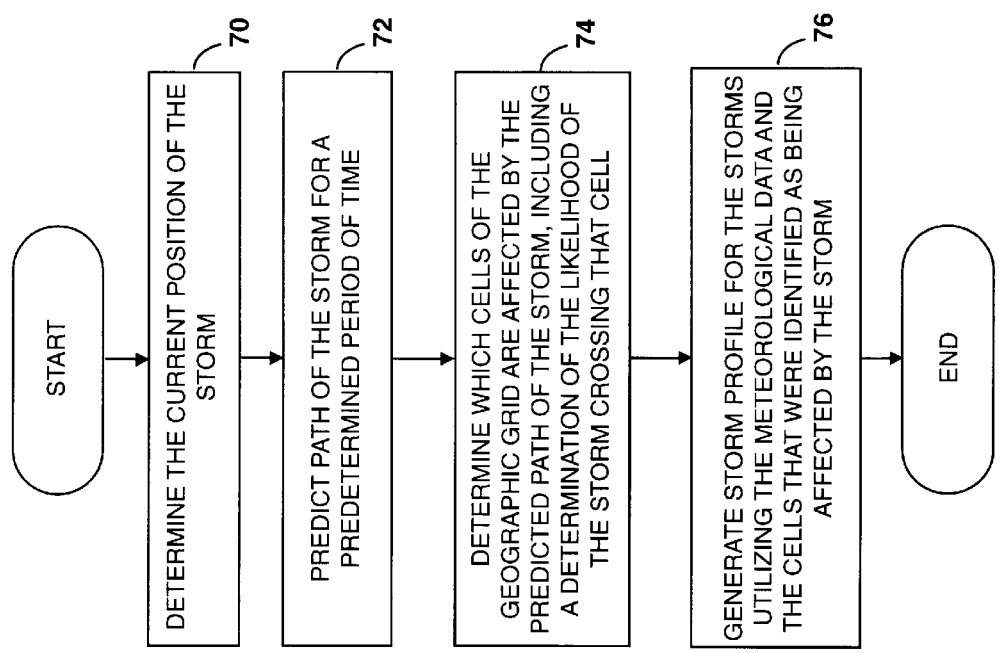
FIG. 5 is a flowchart of the operation of block 62 of FIG. 4.

With reference to FIG. 5, the operation described in block 62 (FIG. 4) is described in further detail. Particularly, the current position of a storm identified in the meteorological data is determined, as indicated by block 70. At block 72, a predicted path of the storm for a predetermined period of time is determined based upon the current position of the storm and the forecasted direction and speed of the storm. It is noted, as discussed above, that the forecasted speed and direction of the storm may be provided in the meteorological data or may be determined based upon historical movement of the storm over a discrete period of time immediately preceding the present location of the storm. At block 74, the cells within the geographical area that are affected according to the predicted path of the storm are determined. This includes the determination of the likelihood of the storm crossing each identified cell, preferably in terms of a presence qualifier. Next, storm profiles are generated for each storm utilizing the meteorological data and the cells that were determined to be affected by the storm in the previous steps, as indicated by block 76. The storm profiles are then distributed as described above.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A system for providing real-time site specific weather information, comprising:

a weather alert manager that receives meteorological data and combines said meteorological data with a geographical grid covering a predefined geographic area to produce a storm profile for a storm within said geographical area, wherein said geographic grid partitions said geographic area into a plurality of cells;

a plurality of remote units, one of said remote units being responsive to said storm profile for presenting real-time site specific weather information; and a distribution network for distributing said storm profile from said weather alert manager to said one of said remote units.

2. The system of claim 1, wherein said storm profile includes a cell identifier that identifies a cell of said geographic grid that is related to said storm.

3. The system of claim 2, wherein said storm profile further includes a storm identifier, a storm type identifier, and a presence qualifier.

4. The system of claim 2, wherein said storm distribution network selectively distributes said storm profile to a first remote unit associated with said cell based upon an address identifying said first remote unit.

5. The system of claim 4, wherein said remote unit is located within said cell.

6. The system of claim 1, wherein said meteorological data comprises a speed of said storm, a location of said storm, a direction of said storm, and a storm type identifier.

7. The system of claim 1, wherein said meteorological data includes a severity indicator of said storm that is provided by a user.

8. The system of claim 1, wherein said meteorological data includes NexRad attributes.

9. The system of claim 1, wherein said distribution network comprises a land-line telephone network.

10. The system of claim 1, wherein said distribution network comprises a wireless network.

11. The system of claim 1, wherein said distribution network comprises a pager network.

12. The system of claim 1, wherein said distribution network comprises a cable television network.

13. The system of claim 1, wherein said remote unit includes an audible alarm that can be selectively actuated to distinguish between a warning alarm and a watch alarm.

14. The system of claim 1, wherein said remote unit includes an visual indicator that is selectively actuated to distinguish between a warning alarm and a watch alarm.

15. The system of claim 1, wherein said remote unit includes an audible alarm that is selectively actuated to indicate a storm type.

16. The system of claim 1, wherein said remote unit includes an visual indicator that is selectively actuated to indicate a storm type.

17. The system of claim 1, wherein said weather alert manager includes means for addressing said storm profile to enable point-to-point distribution to said one of said remote units.

18. The system of claim 1, wherein said weather alert manager includes means for predicting a path of said storm based upon said meteorological data.

19. The system of claim 18, wherein said means for predicting a path of said storm comprises a computer program.

20. A method for providing real-time site specific weather information, comprising the steps of:

receiving meteorological data;

combining said meteorological data with a geographical grid covering a predefined geographic area to produce a storm profile for a storm within said geographical area, wherein said geographic grid partitions said geographic area into a plurality of cells; and distributing said storm profile to a remote unit that is responsive to said storm profile for presenting real-time site specific weather information.

21. The method of claim 20, wherein said step of combining said meteorological data with said geographical grid to produce said storm profile includes producing said storm profile with a cell identifier that identifies a cell of said geographic grid that is related to said storm.

22. The method of claim 20, wherein said step of combining said meteorological data with said geographical grid to produce said storm profile includes producing said storm profile with a storm identifier, a storm type identifier, and a proximity indicator associated with said cell identifier.

23. The method of claim 20, wherein said meteorological data comprises a speed of said storm, a location of said storm, a direction of said storm, and a storm type identifier.

24. The method of claim 20, further including the step of manually providing said meteorological data.

25. The method of claim 20, wherein said meteorological data includes NexRad attributes.

26. The method of claim 20, wherein said step of distributing said storm profile to said remote unit includes distributing said storm profile utilizing a land-line telephone network.

27. The method of claim 20, wherein said step of distributing said storm profile to said remote unit includes distributing said storm profile utilizing a wireless network.

28. The method of claim 20, wherein said step of distributing said storm profile to said remote unit includes distributing said storm profile utilizing a pager network.

29. The method of claim 20, wherein said step of distributing said storm profile to said remote unit includes distributing said storm profile utilizing a cable television network.

30. The method of claim 20, wherein said remote unit includes an audible alarm that can be selectively actuated to distinguish between a warning alarm and a watch alarm.

31. The method of claim 20, wherein said remote unit includes an visual indicator that is selectively actuated to distinguish between a warning alarm and a watch alarm.

32. The method of claim 20, further including the step of providing an audible alarm by said remote unit that is selectively actuated to indicate a storm type.

33. The method of claim 20, further including the step of providing a visual indicator that is selectively actuated to indicate a storm type.

34. The method of claim 20, wherein said step of combining said meteorological data with said geographical grid includes predicting a path of said storm based upon said meteorological data.

* * * * *